(12) United States Patent
Guha et al.

(10) Patent No.: US 7,222,216 B2
(45) Date of Patent: *May 22, 2007

(54) WORKLOAD-ADAPTIVE STORAGE SYSTEM WITH STATIC ALLOCATION

(75) Inventors: Aloke Guha, Louisville, CO (US); Chris T. Santilli, Colorado Springs, CO (US); Will Hays Layton, Plano, TX (US)

(73) Assignee: COPAN Systems, Inc., Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/592,281

(22) Filed: Nov. 1, 2006

(65) Prior Publication Data

US 2007/0073969 A1    Mar. 29, 2007

Related U.S. Application Data

(63) Continuation of application No. 10/691,838, filed on Oct. 23, 2003, now Pat. No. 7,152,142.

(60) Provisional application No. 60/421,075, filed on Oct. 25, 2002.

(51) Int. Cl.
*G06F 12/00*    (2006.01)

(52) U.S. Cl. ............................... 711/114

(58) Field of Classification Search ........... 711/114
See application file for complete search history.

(56) References Cited

U.S. PATENT DOCUMENTS

| 4,914,656 | A | 4/1990 | Dunphy et al. |
|---|---|---|---|
| 5,265,098 | A | 11/1993 | Mattson et al. |
| 5,274,645 | A | 12/1993 | Idleman et al. |
| 5,301,297 | A | 4/1994 | Menon et al. |
| 5,479,653 | A | 12/1995 | Jones |
| 5,787,462 | A | 7/1998 | Hafner et al. |
| 5,835,700 | A | 11/1998 | Carbonneau et al. |
| 5,845,319 | A | 12/1998 | Yorimitsu |
| 5,966,510 | A | 10/1999 | Caboneau et al. |
| 6,098,128 | A | 8/2000 | Velez-McCaskey et al. |
| 6,219,753 | B1 | 4/2001 | Richardson |
| 6,279,138 | B1 | 8/2001 | Jadav et al. |
| 6,526,478 | B1 | 2/2003 | Kirby |
| 6,601,138 | B2 | 7/2003 | Otterness et al. |
| 6,763,398 | B2 | 7/2004 | Brant et al. |
| 2003/0204759 | A1 | 10/2003 | Singh |
| 2003/0212859 | A1 | 11/2003 | Ellis et al. |
| 2004/0153740 | A1 | 8/2004 | Fujimoto |

*Primary Examiner*—Pierre Bataille
*Assistant Examiner*—Paul Schlie
(74) *Attorney, Agent, or Firm*—Charles J. Kulas; Trellis International Property Law Group, PC

(57) ABSTRACT

A method for adaptation of data organization by a data storage system controller is disclosed. Data organization in a data storage system is adapted according to varying workload profiles and system constraints. The data storage system also consists of a plurality of data storage units. On receipt of a request to write data, various workload and data storage system parameters are determined. On the basis of these parameters, target data storage units and appropriate data organization schemes are optimally selected. In the case where the volume of data to be written is less than a threshold value, a RAID organization scheme is preferred. In this scheme the data is written to the selected drives simultaneously. In the case where the volume of data to be written is more than the threshold value, a power managed RAID organization scheme, where all data drives need not be simultaneously powered on, is used.

20 Claims, 10 Drawing Sheets

WORKLOAD-ADAPTIVE STORAGE SYSTEM WITH STATIC ALLOCATION

RELATED APPLICATIONS

This application is a continuation of, and claims priority from, U.S. patent application Ser. No. 10/691,838 entitled "Method for a Workload-Adaptive High Performance Storage System with Data Protection" by Aloke Guha, Chris T. Santilli, and Will Layton, filed on Oct. 23, 2003 now U.S. Pat. No. 7,152,142, which is incorporated by reference as if set forth herein in its entirety.

BACKGROUND

The present invention relates generally to a data storage system. More particularly, the present invention relates to a reliable and workload-adaptive data storage system controller.

Typically, in computing applications, data storage systems consist of devices such as hard disk drives, floppy drives, tape drives, compact disks and the like. These devices are known as storage devices. With an increase in the amount of computation the amount of data to be stored has increased to a great extent. This has led to an increase in the demand for larger storage capacity in the storage devices. Consequently, production of high capacity storage devices has increased in the past few years. However, large storage capacities demand reliable storage devices with reasonably high data transfer rates. Moreover, the storage capacity of a single storage device cannot be increased beyond a limit. Hence, various data storage system configurations and geometries are commonly used to meet the growing demand for increased storage capacity.

A configuration of the data storage system to meet the growing demand involves the use of multiple smaller storage devices. Such a configuration permits redundancy of stored data. Redundancy ensures data integrity in case of device failures. In many such data storage systems, recovery from common failures can be automated within the data storage system itself using data redundancy and error correcting codes. However, such data redundancy schemes may be an overhead to the data storage system. These data storage systems are typically referred to as Redundant Array of Inexpensive (Independent) Disks (RAID). The 1988 publication by David A. Patterson, et al., from University of California at Berkeley, titled "A Case for Redundant Arrays of Inexpensive Disks (RAID)", reviews the fundamental concepts of RAID technology.

Patterson's publication defines five "levels" of standard RAID geometries. The simplest array defined in Patterson's publication is a RAID 1 system. This system comprises one or more disks for storing data and an equal number of additional "mirror" disks for storing copies of the data. The other RAID levels, as defined in Patterson's publication, are identified as RAID 2, 3, 4 and 5 systems. These systems segment data into smaller portions for storage across several data disks. In these systems, one or more additional disks are utilized for overhead storage. Examples of overhead storage include storage of error check and parity information. The choice of RAID level depends upon reliability and performance capability required for a storage application. The extent of fault tolerance determines the reliability shown by the storage device. The input/output (I/O) rate of data is a measure of the performance of a storage device.

The various RAID levels are distinguished by their relative performance capabilities as well as their overhead storage requirements. For example, a RAID level 1 mirrored storage system requires more overhead storage than RAID levels 2, 3, 4 and 5 that utilize XOR parity to provide requisite data redundancy. RAID level 1 requires 100% overhead since it duplicates all stored data, while RAID level 5 requires 1/N of the storage capacity used for storing data, where N is the number of storage units, like data disk drives, used in the RAID set.

The RAID levels are configured in the storage system using a controller module. This module forms an interface between the storage application and the disk drives. The controller module shields the storage application from details relating to the organization and the redundancy of data across an array of disk drives. The controller makes the storage system appear as a single disk drive having larger storage capacity. The controller may distribute the data across many smaller drives. Most of the RAID controller systems provide large cache memory structures in order to further improve the performance of the data storage system. The storage application requests blocks of data to be read or written and the RAID controller manipulates the array of disk drives and the cache memory as required.

There exist a number of patents dealing with improvements and modifications in RAID controllers. One such patent is U.S. Pat. No. 6,279,138, titled "System for Changing the Parity Structure of a Raid Array", assigned to International Business Machines Corporation, Armonk, N.Y. This patent relates to a method for altering the structure of parity groups, e.g., altering the RAID level or number of storage devices included in the RAID array in the event of the failure of the primary controller system when dual controllers are in use.

Another patent dealing with improvements in RAID controllers is U.S. Pat. No. 6,601,138, titled "Apparatus System and Method for N-Way Raid Controller having Improved Performance Fault Tolerance", assigned to International Business Machines Corporation, Armonk, N.Y. The structure and the method disclosed in this patent permit more than two controllers to work together by working under an underlying message passing protocol, to improve system performance and fault tolerance. However, both RAID controllers work on the same RAID set. Use of multiple RAID sets helps in further improving the system performance.

Attempts have been made to provide adaptive RAID technology for the storage systems. FasFile™ RAID, a product from Seek Systems Inc., uses adaptive RAID technology. FasFile™ uses RAID levels 1 and 5 to optimize speed and conserve disk capacity. Furthermore, attempts have been made to enhance the RAID performance by distributing the data proportionally across various disks connected to a RAID controller. U.S. Pat. No. 6,526,478 titled "Raid LUN Creation using Proportional Disk Mapping", assigned to LSI Logic Corporation, Milpitas, Calif., provides a method and system for creating logical units in a RAID system. This patent provides an improvement in performance by providing a method for dividing a logical unit number (LUN) into a plurality of segments or stripes that are distributed across various drives under the RAID controller. However, the maximum data transfer rate cannot be more than that of the RAID controller. The LUN is a unique identifier that enables the differentiation between various devices, each of which forms a logical unit, on a bus. Each LUN identifies a specific logical unit, which may be an end user, a file, or an application program.

In addition to the RAID technique, a number of other techniques for increasing storage capacity exist in the art. One such technique involves incorporating multiple disk drives in the data storage system. A larger amount of energy is required to operate the system because of multiple disk drives. However, the reliability of the system decreases because of the increased heat generation by the multiple disk drives in the system. Additionally, a limited power supply imposes constraints on the system, whereby all disk drives cannot be powered on simultaneously. A power-constrained system requires the powering up of a least number of drives, thereby further constraining the number of drives in the active RAID set. This problem is examined in the U.S. patent application Ser. No. 10/607,932, titled "Method and Apparatus for Power-Efficient High-Capacity Scalable Storage System" filed on Sep. 12, 2002 assigned to Copan Systems Inc., wherein an optimal power managed RAID scheme is described, which is incorporated by reference as if set forth herein in its entirety.

An assumption made in existing data storage system configurations is a fixed workload profile, such as fixed transaction volume size, fixed target input/output (I/O) rate and so on. Thus, these data storage systems define their data organization statically during the initial storage controller configuration time. This configuration will suffice if the variations in the workload profile are not much as compared to the static configuration. However, if the workload profiles change, such as size of transaction volumes vary or I/O rates differ, then RAID organization has to be redefined. In this case, all the old data needs to be mapped on the new data and disk configuration. Therefore, in a large-scale storage system where a large number of hosts are supported with, possibly, different workload profiles, a single RAID organization is not adequate to meet the performance requirements of all hosts.

Most of the existing techniques for increasing the capacity of storage devices are limited to altering the RAID levels and providing multiple storage controllers. These techniques provide adaptive support for a limited storage capacity. However, they do not provide any support for various system constraints. Most of these techniques are incapable of handling varying workload profiles and system constraints. Moreover, these techniques do not use multiple RAID sets and combination of different RAID levels to provide greater degrees of flexibility in applications that have varying transaction volume size and varying levels of performance.

From the above discussion it is evident that there is a need for a solution for optimizing performance of the data storage system by providing different data organization schemes to handle varying workload profiles. The solution should be able to handle hundreds of drives for providing large-scale storage capacity, while maintaining performance and reliability. Further, there is a need for a data storage system to work under the given system constraints. The data storage system should also distribute data across an array of RAID controllers to enhance the data storage system performance.

SUMMARY

An object of the disclosed invention is to optimize the performance of a data storage system in accordance with various constraints.

Another object of the disclosed invention is to provide a data storage controller that automatically adapts the data organization in order to satisfy different workloads and respond to power constraints of the data storage system.

Yet another object of the disclosed invention is to provide higher storage capacity in a data storage system while maintaining performance and reliability.

A further object of the disclosed system is to distribute data across an array of disk drives for improving the data storage system performance.

The disclosed invention is directed to a workload adaptive data storage system. The workload-adaptive data storage system consists of a data storage system controller, a plurality of data storage units and an interconnect between the controller and the data storage units. The data storage system controller adaptively determines a data organization scheme for optimizing the performance of the data storage system. The plurality of data storage units comprising multiple disk drives are used to store data. The interconnect facilitates the communication between the data storage system controller and the plurality of data storage units.

The disclosed invention provides a method for adaptation of data organization by a data storage system controller in the data storage system. The data storage system is supplied with workload from storage applications. The parameters that characterize the workload and the data storage system are determined. On the basis of these parameters, possible configurations of the data storage system are determined. These configurations optimize the performance of the data storage system according to the given power constraints.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The disclosed invention provides a solution for optimizing the performance of a data storage system by providing different RAID organizations to handle different workloads in the same data storage system. The solution also enables the data storage system to function under specified power and system constrains.

Figure 1:
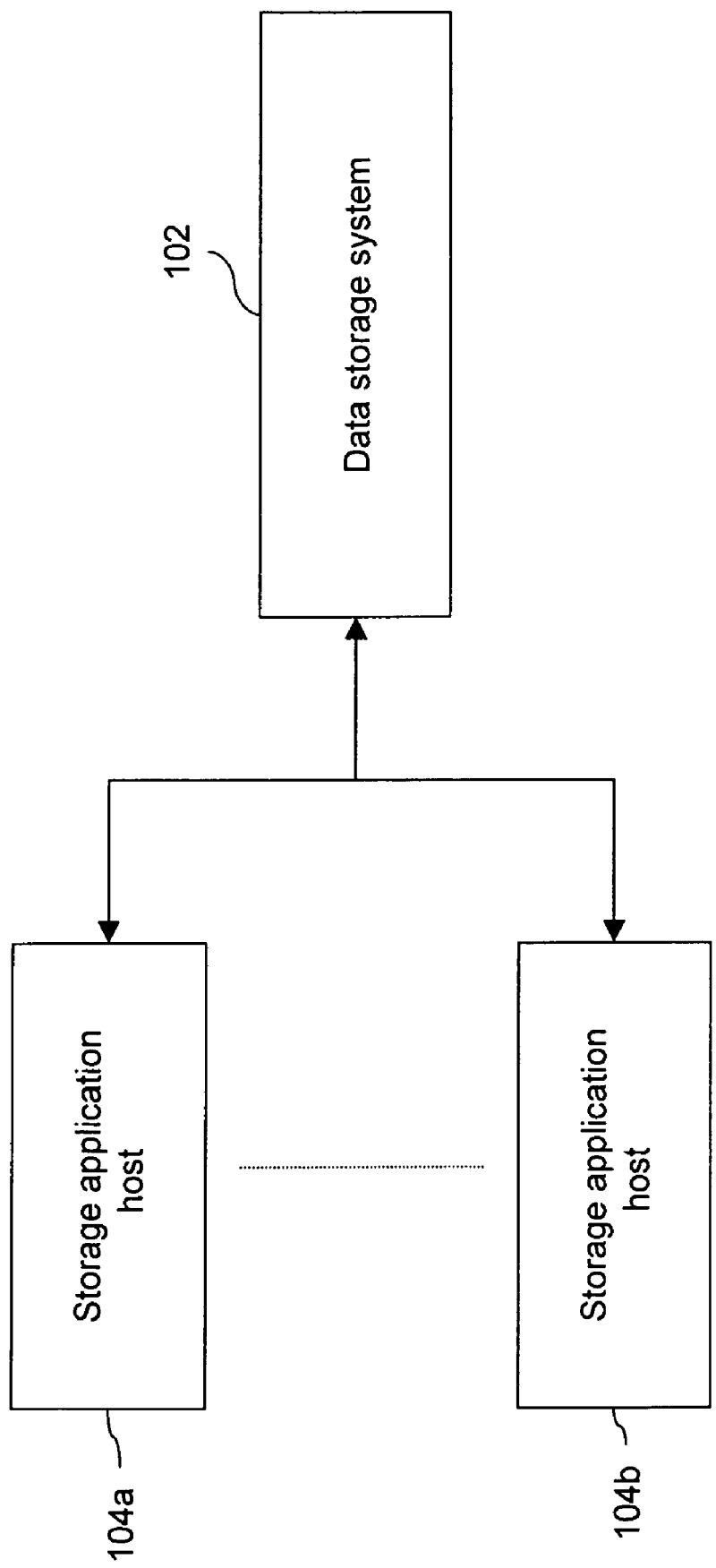
FIG. 1 is a block diagram showing the environment for the disclosed invention.

FIG. 1 is a block diagram showing the environment for the disclosed invention. Data storage system 102 is connected to a plurality of storage application hosts 104. The various components of data storage system 102 will be explained in detail in conjunction with FIG. 2. Storage application hosts 104 have storage applications running on them. Applications that carry out data read/write operations and, hence, require data storage capacity, are termed as storage applications. These applications may require data transfer operations to storage units or to other applications. There may be a plurality of storage applications executing on a single storage application host 104. It should be noted that, for the purposes of this disclosure, identical items in the figures may be indicated by identical reference numerals followed by a lowercase letter, for instance, 104a, 104b and so on. The items may be collectively referred to herein simply by the reference numeral.

Data Storage System

Figure 2:
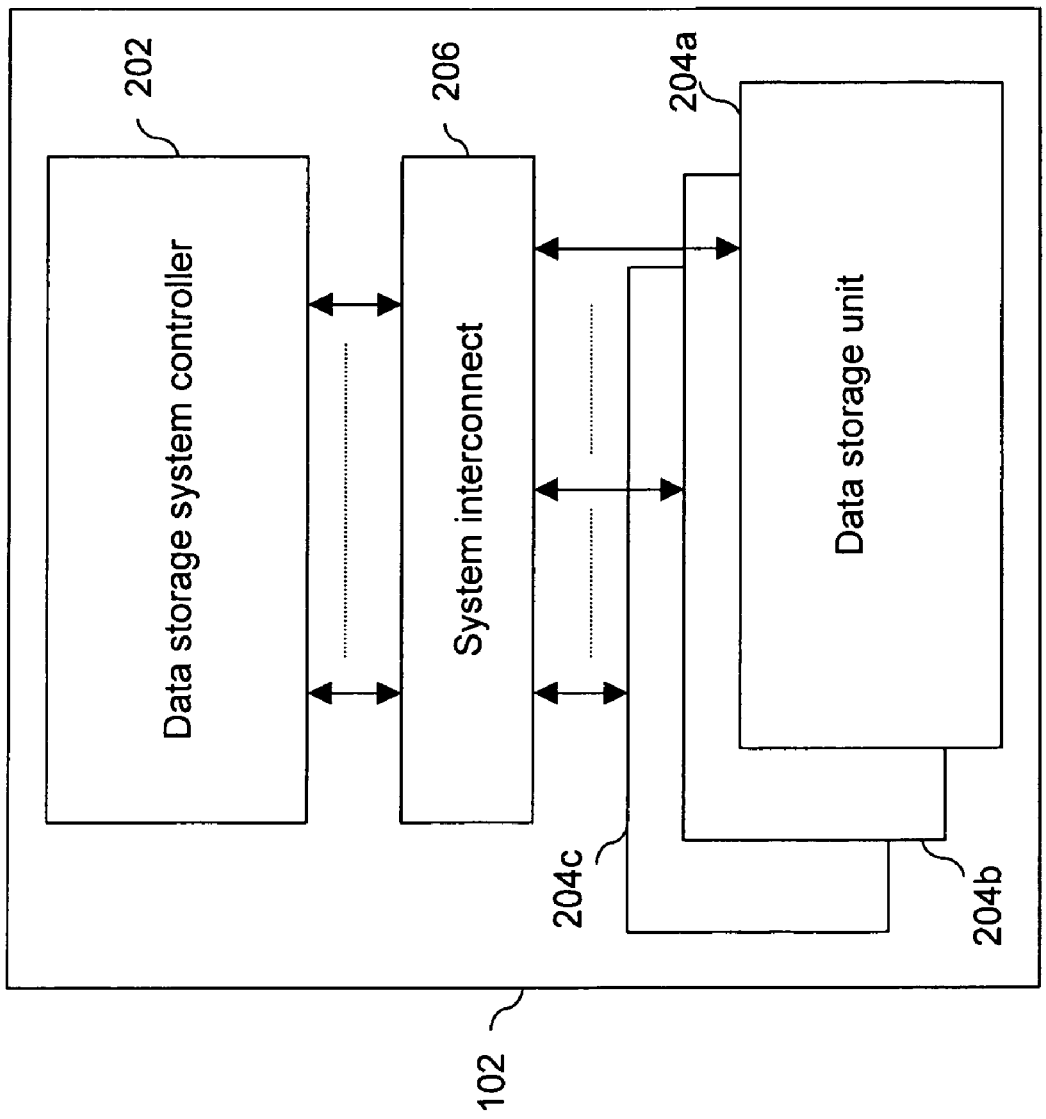
FIG. 2 is a block diagram showing elements of a data storage system according to an embodiment of the disclosed invention.

FIG. 2 is a block diagram showing elements of data storage system 102 according to an embodiment of the disclosed invention. Data storage system 102 consists of a data storage system controller 202, a plurality of data storage units 204 and a system interconnect 206. Data storage system controller 202 and data storage unit 204 will be explained in detail in conjunction with FIG. 3 and FIG. 4 respectively. Data storage system controller 202 is connected to the plurality of data storage units 204 by system interconnect 206. System interconnect 206 enables the communication between data storage system controller 202 and the plurality of storage units 204. System interconnect 206 may be implemented as a switch, a high-speed bus, or a multiplexer. The design of system interconnect 206 is independent of data storage system controller 202 and data storage unit 204 architecture.

Data Storage System Controller

Figure 3:
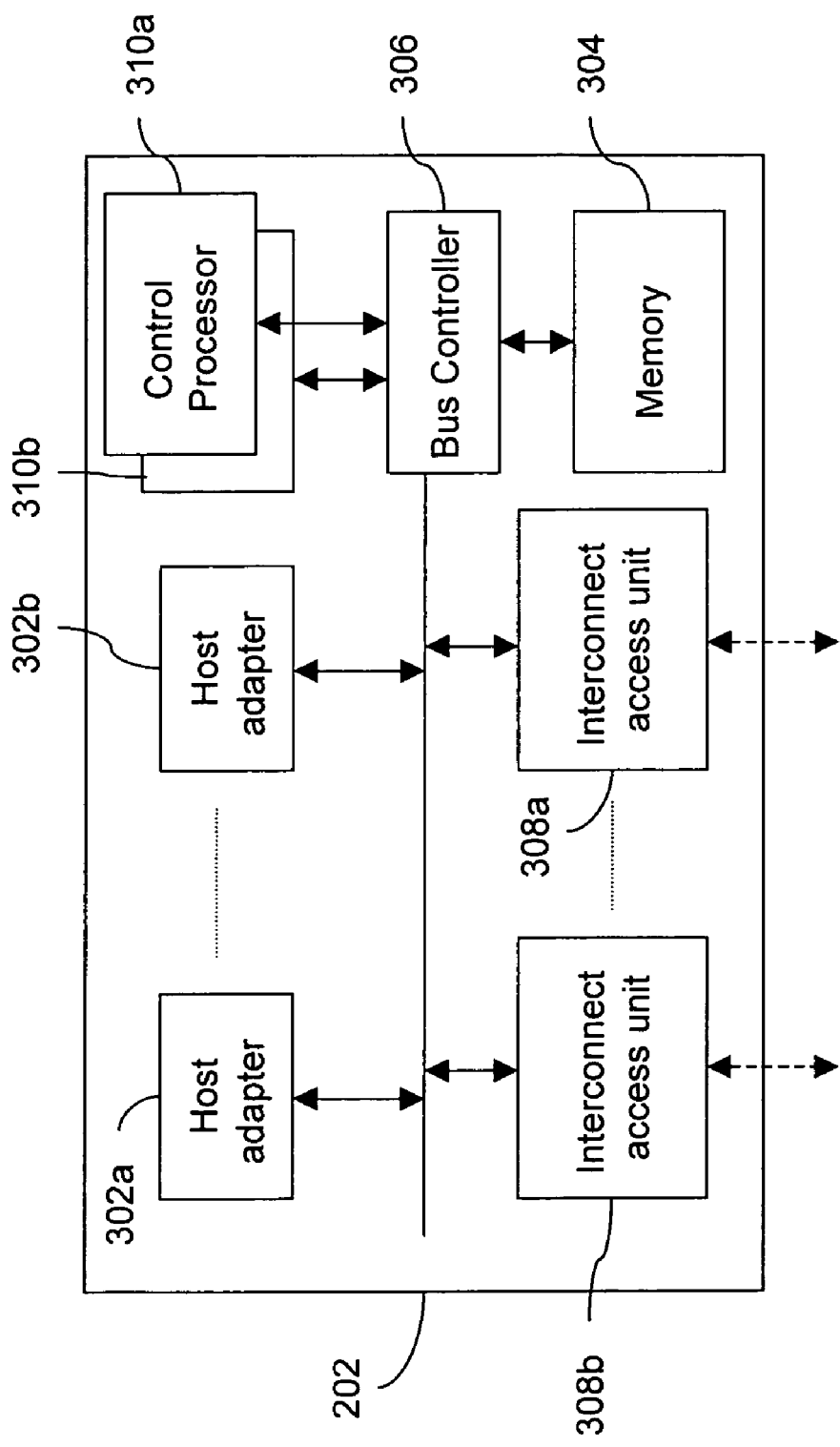
FIG. 3 is a block diagram showing the components of a data storage system controller according to an embodiment of the disclosed invention.

FIG. 3 is a block diagram showing the components of data storage system controller 202 according to an embodiment of the disclosed invention. Data storage system controller 202 consists of a plurality of host adapters 302, a memory unit 304, a bus controller 306, a plurality of interconnect access units 308 and at least one control processor 310. Storage application hosts 104 connect to data storage system 102 using the plurality of host adapters 302. The design of data storage system controller 202 is based on commonly used architectures. Host adapters 302 process the local connectivity protocol, such as the Fibre Channel protocol, and transmit data and commands to control processors 310. Data storage system controller 202 may comprise more than one control processor 310 to handle the controller's workload. Memory 304 serves as a buffer for data and commands from host adapters 302 and control processors 310. Bus controller 306 connects control processors 310 and memory 304 to the internal bus of data storage system controller 202. A plurality of interconnect access units 308 connect data storage system controller 202 to system interconnect 206.

Data Storage Unit

Figure 4:
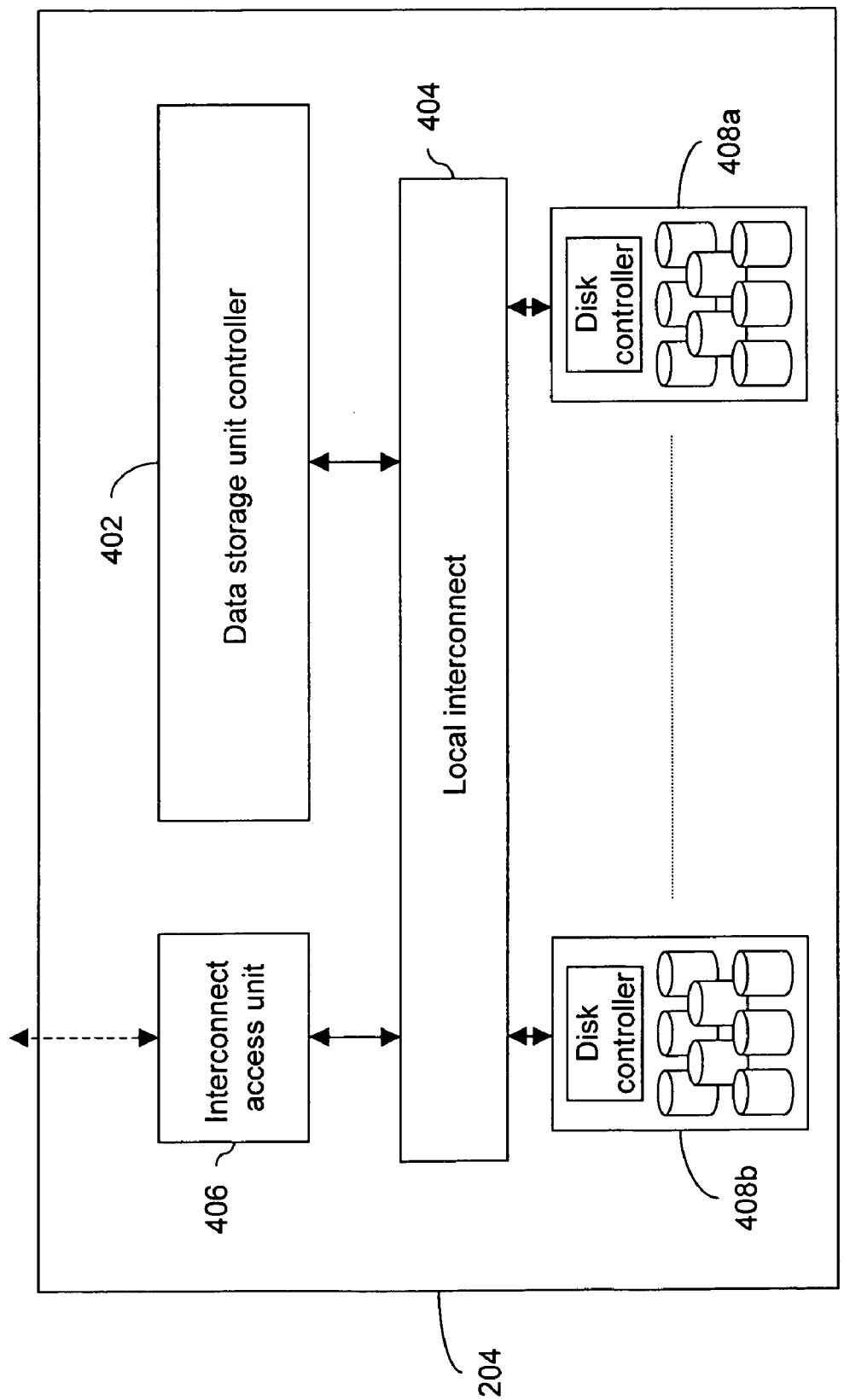
FIG. 4 is a block diagram showing the components of a data storage unit according to an embodiment of the disclosed invention.

FIG. 4 is a block diagram showing the components of data storage unit 204 according to an embodiment of the disclosed invention. Data storage unit 204 consists of a data storage unit controller 402, a local interconnect 404, an interconnect access unit 406, and a plurality of disk systems 408. Data storage unit controller 402 is connected to multiple disk systems 408 using local interconnect 404. This interconnect may be implemented as a switch, a bus or a multiplexer. The design of local interconnect 404 is independent of data storage unit 204. Each disk system 408 comprises multiple drives and a disk controller that manages various disk operations such as, data read/write operations and data transfer between storage units and drives. Interconnect access unit 406 connects data storage unit 204 to system interconnect 206. The multiple disk drives in each disk system 408 are configured as RAID sets according to various RAID schemes. The various possible RAID set configurations using RAID schemes and their variants will be discussed later. Each of the multiple disk drives can be individually powered on or off independent of other disk drives.

Data Storage Unit Controller

Figure 5:
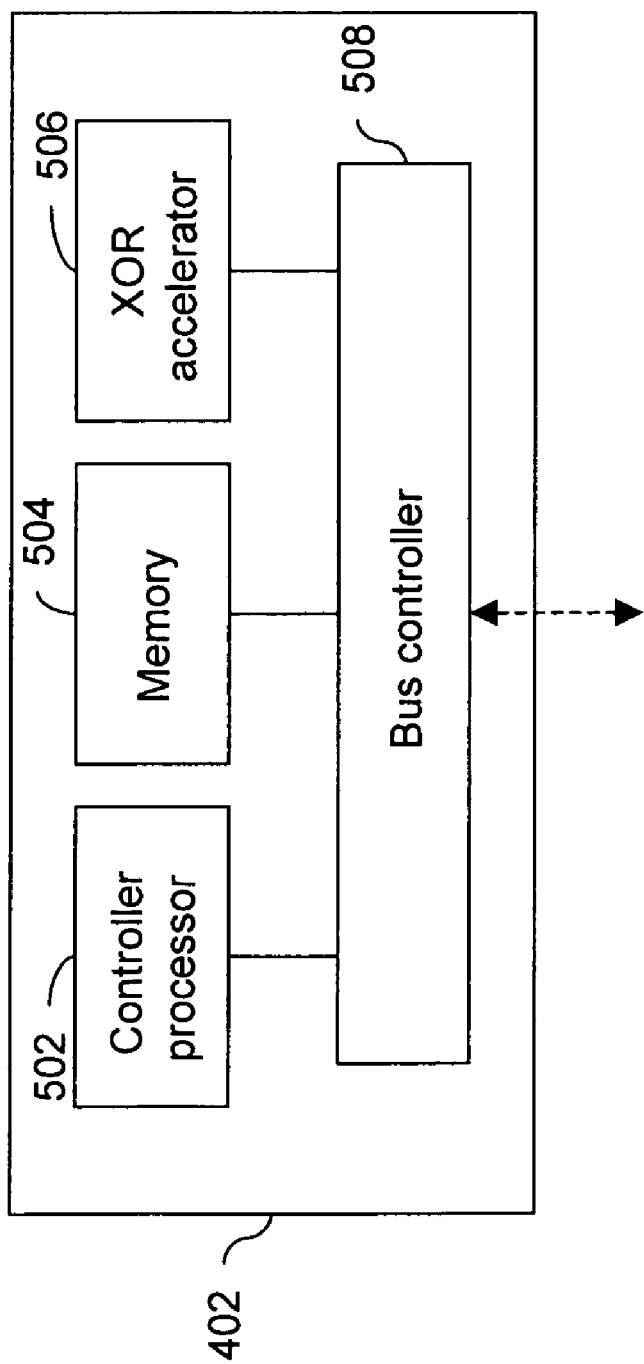
FIG. 5 is a block diagram showing the components of a data storage unit controller according to an embodiment of the disclosed invention.

FIG. 5 is a block diagram showing the components of data storage unit controller 402 according to an embodiment of the disclosed invention. Data storage unit controller 402 is made up of a controller processor 502, a memory 504, a XOR accelerator 506 and a bus controller 508. Data storage unit controller 402 performs two control functions. Firstly, it provides data protection functions. One such data protection function is RAID support using XOR accelerator 506. Secondly, controller processor 502 handles the data storage requests to disk systems 408. Memory 504 is used as a buffer for staging and caching data and commands. Controller processor 502, memory 504, and XOR accelerator 506 are interfaced through bus controller 508.

In an embodiment of the disclosed invention, data storage system controller 202 is interconnected with data storage units 204 using Fibre Channel interconnects. Data storage unit controller 402 can provide support for various RAID data organization schemes and combinations. The RAID functions are implemented in firmware, For example, XOR accelerator 506 may be implemented along with control processor 502 using a XOR-equipped Intel IOP321 processor. Memory 504 may be SDRAM chips. Data storage units 204 may be implemented using Serial Advanced Technology Attachment (S-ATA) disk drives. Local interconnect 404 may be implemented using a S-ATA channel controller and a PCI-X bus interface. Disk controllers in disks 408 may be implemented using S-ATA interconnect controllers. It may be apparent to anyone skilled in the art that the examples of implementations given above are only for illustrative purposes and do not limit the scope of the disclosed invention.

Figure 6:
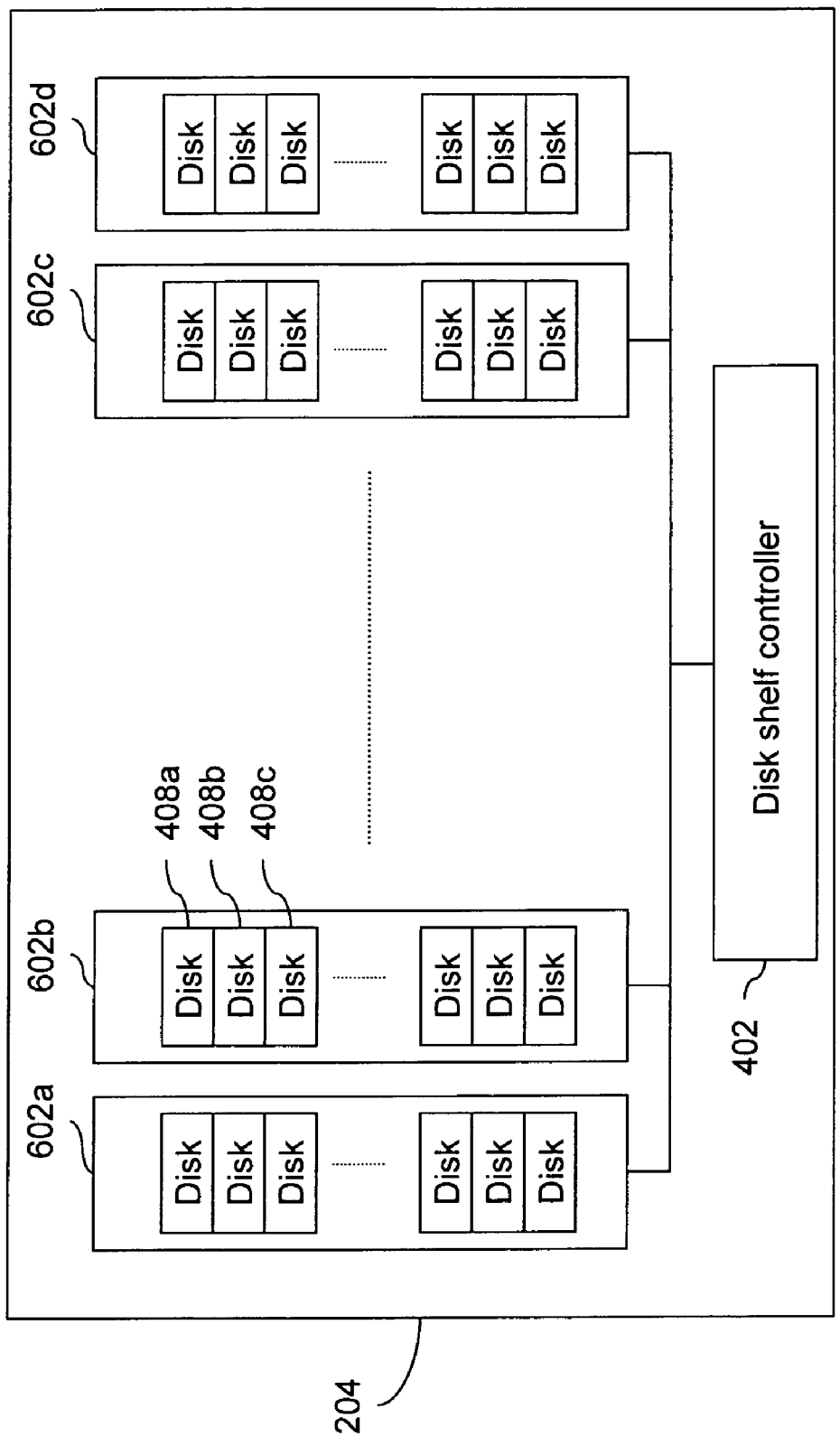
FIG. 6 is a block diagram illustrating a configuration of the data storage system comprising multiple disk systems in an array according to an embodiment of the disclosed invention.

A configuration of data storage system 102 has been described above. Another possible configuration of data storage system 102 may have multiple disk systems 408 in an array. This configuration provides a high density packing and interconnection of disk drives. FIG. 6 is a block diagram illustrating a configuration of data storage system 102 comprising multiple disk systems 408 in an array according to an embodiment of the disclosed invention. Data storage unit 204 is made up of a data storage unit controller 402 and a plurality of sticks 602. Each stick 602 contains multiple disk systems 408. Data storage unit controller 402 is connected to each of sticks 602. This interconnection enables individual control of disk systems 408 in the stick, both in terms of the data access and powering on/off of disk systems 408.

Data Protection Schemes

Figure 7:
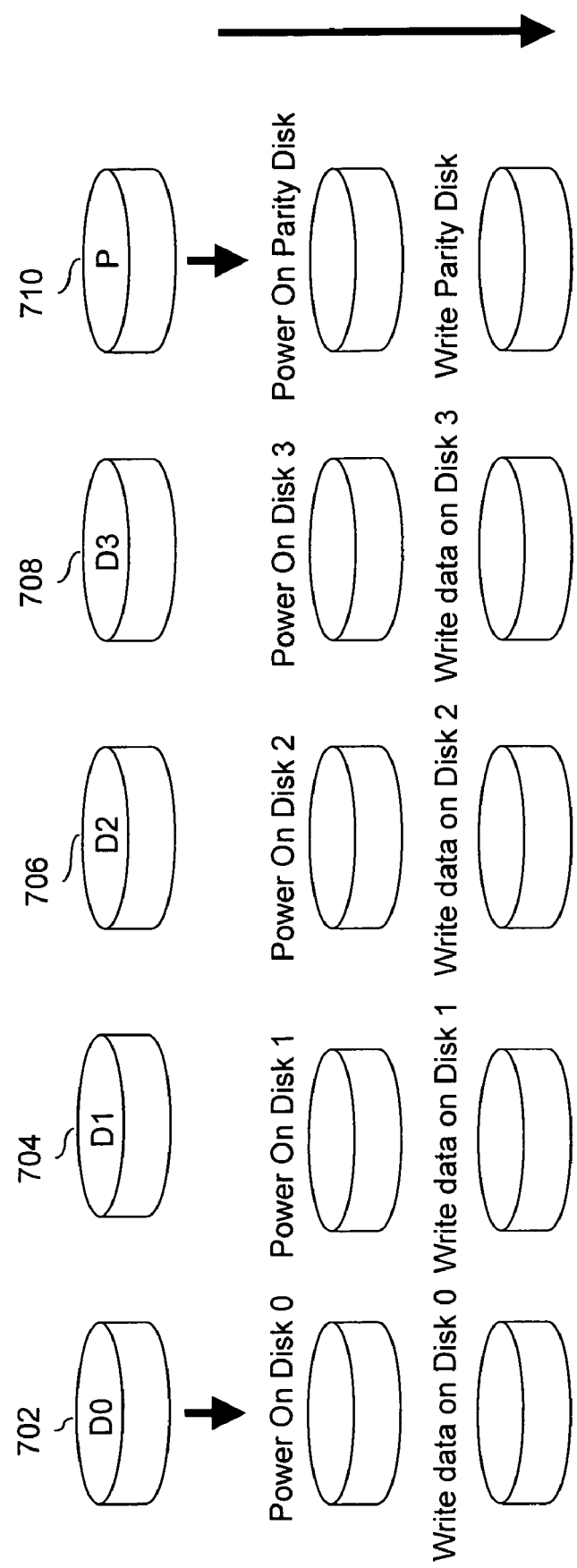
FIG. 7 is a block diagram illustrating a RAID data protection scheme according to an embodiment of the disclosed invention.

Various data configurations used in data storage systems 102 are aimed at providing reliability with as little an effect on the performance of the system as possible. Data storage system 102 is termed reliable only if it prevents the loss of data in spite of disk failures. Data loss can be prevented using an efficient data protection scheme. Data protection is achieved using a RAID redundancy or parity protection. The RAID scheme and various RAID levels are well known in the art and their use in data protection should be apparent to anyone skilled in the art. In RAID 4 scheme, data and parity are written on multiple drives. Hence, all the drives are required to be powered on. For instance, FIG. 7 is a block diagram illustrating a RAID data protection scheme according to an embodiment of the disclosed invention. The data protection scheme illustrated is a 4+1 RAID 4 scheme. This scheme comprises four data drives, namely 702, 704, 706 and 708, and parity drive 710. It should be noted that the disk drives are arranged horizontally in the figure and each vertical column represents a single disk at different points in time. In the RAID scheme, data is written into all the drives simultaneously. In order to perform a write operation on this RAID set, all the drives, 702, 704, 706, 708 and 710, need to be powered on simultaneously.

In case of power constrained system, it may not be feasible to power all the drives on simultaneously. A variant of the RAID scheme is implemented to meet such power constraints of the system. This variant of the RAID scheme has been explained in U.S. patent application Ser. No. 10/607,932 titled "Method and Apparatus for Power Efficient High-Capacity Scalable Storage System", filed on Sep. 12, 2002, assigned to Copan Systems Inc, which has been incorporated by reference herein. This variant is a power managed RAID scheme. In this scheme, sequential writing onto the disk drives is implemented, unlike the simultaneous writing as performed in RAID 4 scheme. This form of writing on to the disks is also known as daisy chaining. The sequential writing onto disk drives reduces power consumption because it requires powering up of one data disk at a time. The parity disk is assumed powered on all the time. This power managed RAID scheme is also referred as Redundant Array of Independent Volumes (RAIV) in this disclosure.

Figure 8:
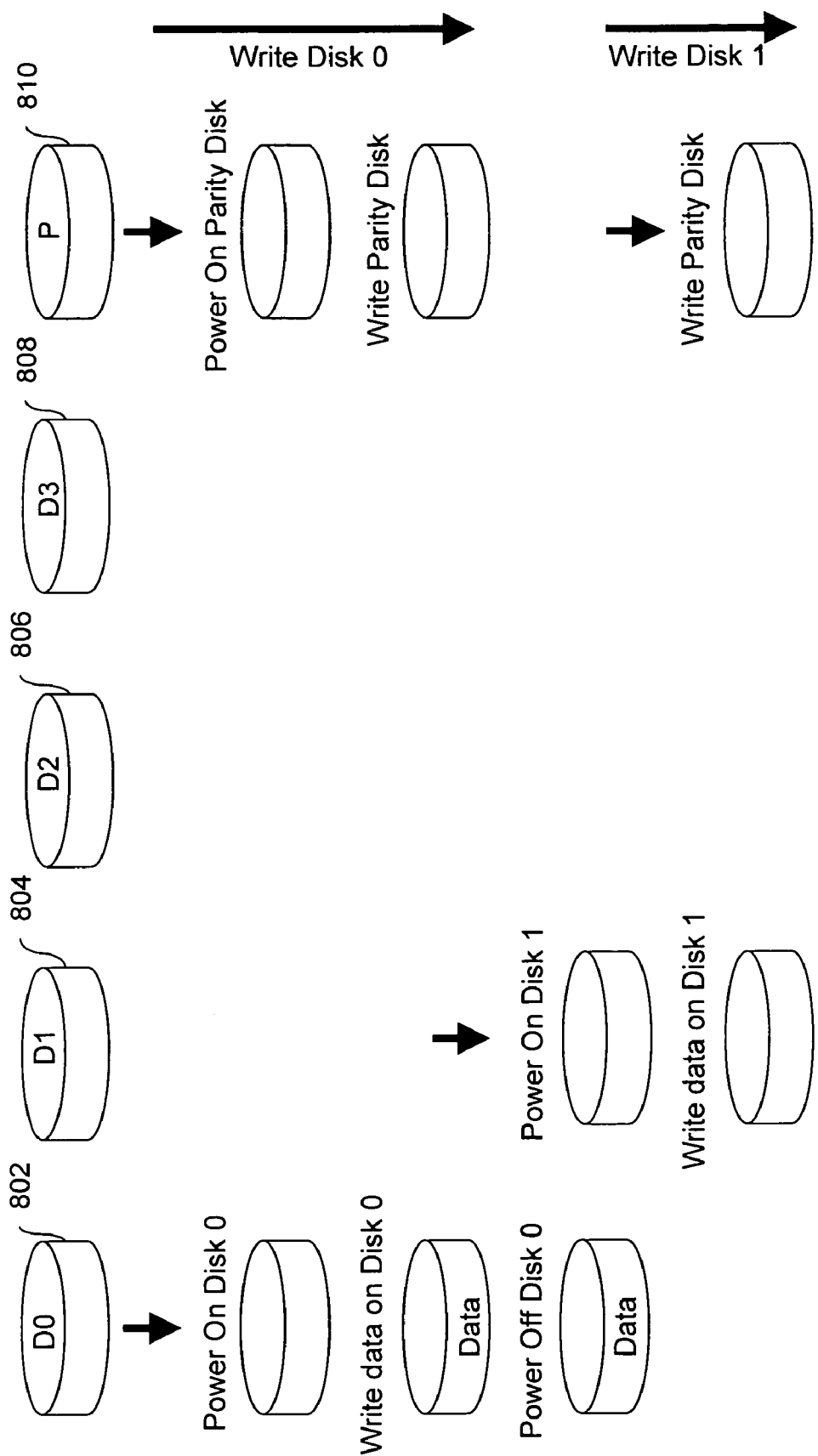
FIG. 8 is a block diagram illustrating the manner in which information is written on to various disks in a RAIV data protection scheme.

FIG. 8 is a block diagram illustrating the manner in which information is written on to various disks in a RAIV data protection scheme. FIG. 8 also shows the manner in which disk drives are powered on and off in the RAIV scheme. FIG. 8 shows four data drives, namely 802, 804, 806, and 808, and a parity drive 810. It should be noted that the disk drives are arranged horizontally in the figure and each vertical column represents a single disk drive at different points in time. These drives can be powered on and off independently. As shown in FIG. 8, when data is to be written on disk drive 802, that disk drive is powered on. Data is written on the disk drive and then it is powered off. Disk drive 804 is powered on only when disk drive 802 is powered off. Similarly, disk drive 806 is powered on only when disk drive 804 has been powered off and so on. An initialized set of these disk drives, both data and parity drives, consists of a mapped organization of data in which a single disk drive failure will not result in loss of data. For this scheme, all disk drives, 802, 804, 806, 808 and 810, are initialized to a value of 0.

The presence of zero-initialized disks, 802, 804, 806, 808 and 810, is used as a basis for creating "rolling parity" update. For instance, all disk drives 802, 804, 806, 808, and 810, are initialized to hexadecimal value 0. The content of parity drive 810 is the result of XOR computation on the contents of disk drives 802, 804, 806, and 808, which is equal to hexadecimal value 0 ($0 \oplus 0 \oplus 0 \oplus 0 = 0$). If data having a value of hexadecimal 5 were written on the disk drive 802, then parity drive 810 value would be hexadecimal 5 ($5 \oplus 0 \oplus 0 \oplus 0 = 5$). If the hexadecimal value A is written to disk drive 804, then parity drive 810 value would be hexadecimal F ($5 \oplus A \oplus 0 \oplus 0 = F$). In this scheme, it is not necessary to power on all the disk drives simultaneously to generate correct parity. When new data is written onto any of the disk drives, executing an XOR operation between the old parity value and the new data value generates new parity value. Therefore, powering on only one disk drive, on which the data is to be written, and parity drive 810 is sufficient to provide a reliable data protection scheme. Thus, powering on of only 2 disk drives is required as opposed to powering on of all 5 disk drives in a conventional RAID system.

The RAIV scheme discussed above assumes the presence of a separate drive 810 for parity as in a power-managed RAID 4 system. Other RAID systems are well known in the art and have been described in the 1988 publication by David Patterson, titled "A Case for Redundant Arrays of Inexpensive Disks (RAID)". It is apparent to any person skilled in the art that the RAIV scheme for power management may be applied to any system containing any number of data and parity drives. This is also illustrated by the following example. Let there be six RAID sets, each consisting six drives which may or may not include a separate parity drive. Let the system constraint be that a maximum of 12 drives can be powered on at a given time. If the data organization scheme in all the six RAID sets is RAID 4, then all the RAID sets can be powered on simultaneously. This is so because RAID 4 can be powered on with only 2 of its constituent drives powered on. However, if the RAID organization schemes on the six RAID sets are different RAID levels, then all the six drives of any two RAID sets can be completely powered on simultaneously in order to satisfy the system constraint using the RAIV scheme. Thus, it may be apparent to anyone adequately skilled in the art that RAIV data organization scheme can be used to manage any given power constraint.

Workload Adaptation

Figure 9A:
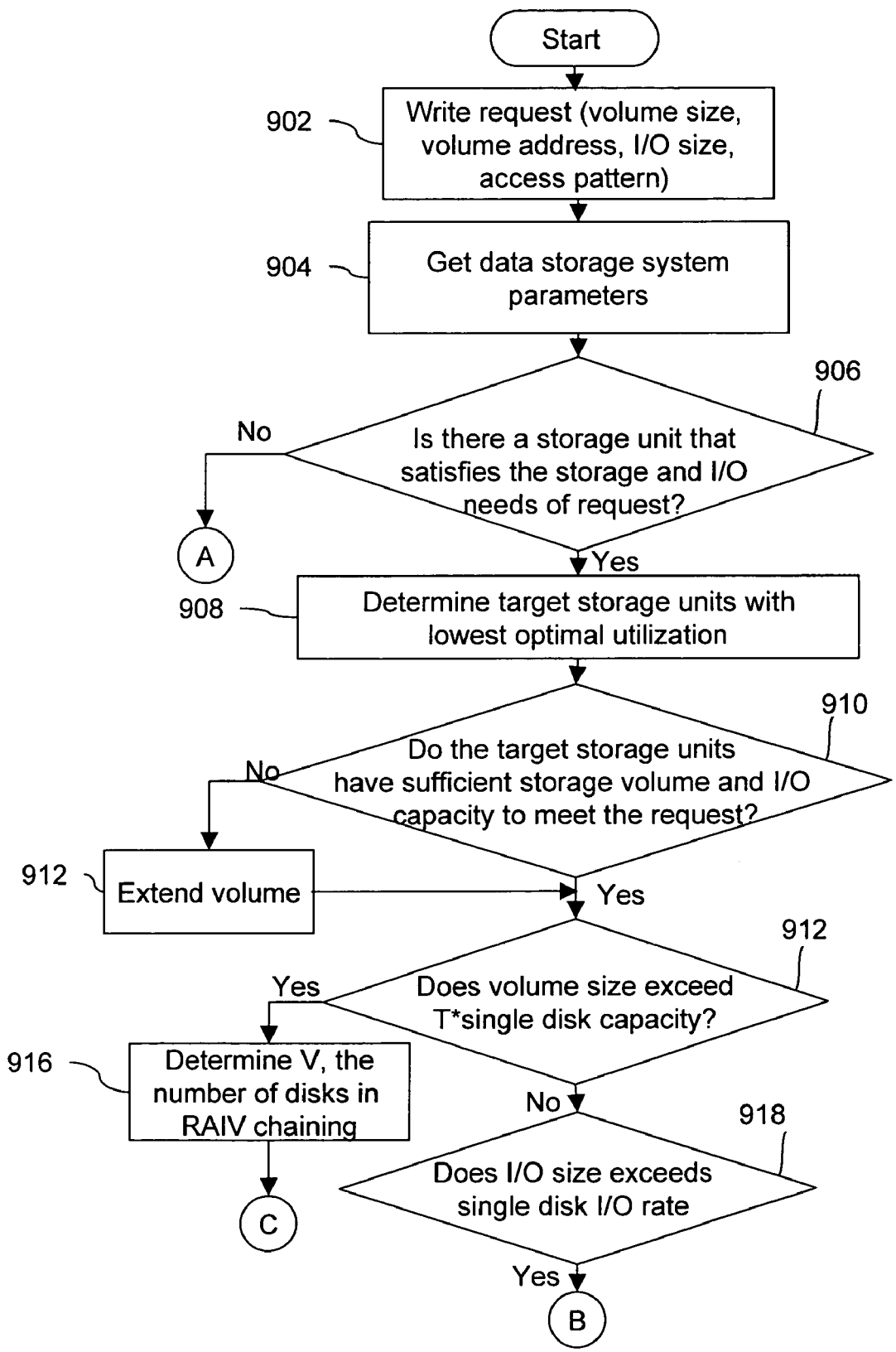
FIG. 9A and FIG. 9B illustrate the flow chart depicting method steps in accordance with an embodiment of the disclosed invention.
Figure 9B:
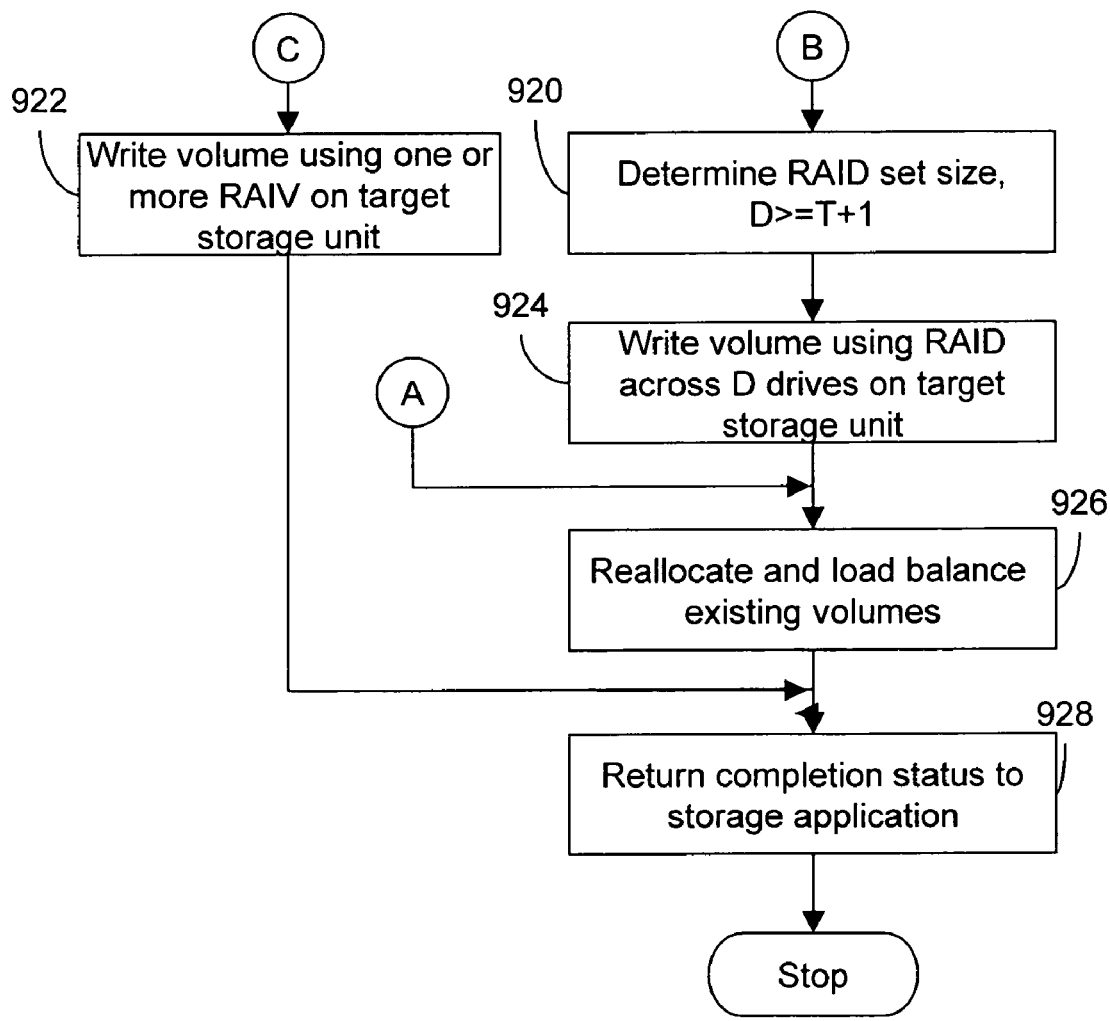

Having described the various elements of data storage system 102, data protection schemes and various data organization schemes, the various steps of achieving workload adaptation in a data storage system are discussed below in association with a flow chart. FIG. 9A and FIG. 9B are flow charts depicting the method steps in accordance with an embodiment of the disclosed invention. At step 902, a write request for a volume is received from storage application host 104 along with a volume identifier or a logical unit number (LUN). The user may configure the LUN at the time of its creation. The volume identifier or LUN represents the volume of data that is to be written. The workload adaptation utilized by data storage system 102 is based on the workload from storage application hosts 104. The workload is characterized by various parameters such as volume size allocated, target Input/Output (I/O) rate, I/O size and access pattern. The Target I/O rate can be in megabytes per second, and if is not explicitly specified then the maximum allocated I/O rate is assumed. I/O size represents the size of the data block transferred at an instant. The I/O size is measured in terms of kilobytes or megabytes. The access pattern specifies the access frequency or the temporal access pattern to the storage volume. The temporal access pattern is the manner in which the volume is accessed with reference to time. For example, consider a database containing personal information of employees of a company. If the name of an employee is accessed in this database, then it is highly probable that the email id of that employee will also be accessed subsequently. The temporal access pattern indicates all such probable access activities. The configured LUN is used to determine the access pattern and the workload for the given volume. The received write request may be mapped to any one of disk drives 802, 804, 806 and 808 using the logical block address of the configured LUN.

At step 904, data storage system controller 202 determines data storage system 102 parameters. These parameters include the current storage utilization per data storage unit for all data storage units 204, the current I/O load per data storage unit for all data storage units 204, the number of drives currently powered on per data storage unit 204, the maximum number of drives that can be powered on and the I/O capacity per data storage unit 204 in data storage system 102. At step 906, data storage controller 202 estimates the number of data storage units 204 that have sufficient storage capacity to allocate the volume. Data storage units 204 having a combination of the lowest utilized storage capacity and the least I/O utilization is selected at step 908. These data storage units are referred as target data storage units. For example, consider two data storage units A and B. Both A and B satisfy the requested volume requirements and have identical I/O rates of 200 kbps. A has a storage capacity of 20 GB and B has a storage capacity of 40 GB. The current utilization and I/O rate of A is 1 GB and 50 kbps respectively, and the current utilization and I/O rate of B is 19 GB and 100 kbps respectively. In this case, A will be designated as a target storage unit, since it has the lowest utilized storage capacity and lowest I/O utilization. At step 910, the target data storage units are checked for sufficient storage and I/O capacity to meet the volume request. If target data storage unit does not have sufficient storage capacity and I/O capacity to meet the current volume request, then the available volume is expanded by adding in unallocated drives to the volume at step 912. For instance, adding in more data drives to the existing RAID set can expand the volume.

On finalization of the target data storage units; data storage system controller 202 determines the optimal data organization scheme, i.e. RAID or RAIV, which would optimize the I/O performance for the allocated volume. The selection of RAID or RAIV is done after comparing the allocated volume with a threshold volume size. The threshold volume size is a factor "T" times the size of a single drive. If the volume size exceeds T times the single drive capacity, then the RAIV data organization scheme is chosen, otherwise RAID data organization is selected at step 914. For instance, if T=2 and a single disk capacity is 160 GB, then any volume that exceeds 320 GB will be written using the RAIV data organization scheme. The value of "T" can either be set by the user via a user Interface or can be implied by the capacity of each of disk drives 802, 804, 806 and 808.

In the RAIV data organization scheme, the number of disk drives powered up is determined at step 916. The number of disk drives powered on depends on the volume size of a single disk drive and the rate at which data is written. For instance, consider a 7+1 RAIV system with each disk drive I/O capacity equaling 50 Megabytes per second. If the data is written at a rate of 100 megabytes per second, then minimum of two data drives and a parity drive needs to be powered on.

A RAID data organization scheme is selected to maximize I/O performance if the volume size does not exceed the threshold volume size. If the I/O size exceeds a single disk I/O rate at step 918, then the number of drives, D, in the RAID set is determined by the desired I/O rate at step 920. For instance, if the desired I/O rate is 100 megabits per second and a single disk I/O rate is 50 megabits per second, then two data and a parity drive is selected to meet the above requirement. Thus, D, the number of drives required in the RAID set, equals 3.

After choosing a RAID or RAIV format, data storage system controller 202 maps and writes the volume to specific drives in data storage unit 204 at steps 922 and 924. A target set of disk drives 408 on which the volume is written is determined by the available unused drives. Additionally, the drives, which are powered up during any write operation, are not made adjacent. However, they are kept as proximate as possible to reduce vibrations, electrical noise, and heating problems. For instance, within a given RAID set corresponding to a LUN, the write operations would be performed on a contiguous set of disk drives if RAIV is used. When multiple LUNs reside on the same shelf 602, then drives in different LUNs would be made physically distant in order to minimize thermal heating and electrical vibrations.

At step 926, reallocation and load balancing of the existing volumes take place. After the initial write operation, the availability status of various current resources is checked. The current resources include the interconnect, the memory and the disk drives. The availability status is used for the further allocation of resources. Moreover, the final destination LUN is also designated based on this availability status of the resources. Thus, overloading of the resources is avoided. Hence, load balancing of existing volumes is achieved. Once the volume is written, a completion status is sent to storage application host 104 at step 928. The completion status indicates successful completion of the write operation on data storage system 102. This completion status serves as an acknowledgement signifying the completion of the write request.

Exemplary Data Organization Configuration Embodiments

In an embodiment of the disclosed invention, the data is striped across multiple data storage units 204. Normally, data storage system controller 202 forwards an I/O request to a data storage unit 204 where the storage volume is resident. This limits the maximum I/O limit to the maximum rate that can be supported by data storage unit controller 402. According to an embodiment of the present invention, the LUN could be distributed across multiple shelves 602. Therefore, I/O requests from data storage system controller 202 will result in I/O requests made to multiple data storage units 204. Furthermore, when the LUN is striped across multiple data storage units 204, the I/O performance increases proportionally to the number of data storage units in the stripe. For instance, if LUNs are striped across 7 units, the I/O performance will scale to 7 times the data rate from a single unit.

Another embodiment of the present invention provides multiple data organization schemes, RAID and RAIV, on a single data storage unit 204. Normally, the data organization on data storage unit 204 is RAIV. One configuration, for instance, could be RAIV structured as 7+1 RAID organization. Thus, there are 7 data drives and a parity drive. In case of a write operation, only the parity drives and data drives, 1 to 7, are powered on. So a minimum of two drives out of eight drives in the RAID set needs to be powered on. Whereas in case of read operation, only data drives, 1 to 7, need to be powered on. Therefore, a minimum of one of eight drives needs to be powered on. Since the interconnecting architecture as shown in FIG. 6 allows connectivity to all drives, any RAID set size is feasible in case large LUN creation is required. For instance, smaller RAID sets such as a 3+1 RAID as well as larger sets such as a 31+1 RAID are possible. Additionally, in case of smaller RAID sets, such as a 3+1 RAID, the entire RAID set can be powered and RAIV need not be used. Also, depending upon the data performance required per LUN in shelf 602, the LUN could be mapped to smaller RAID set or larger RAIV set. Thus, RAID and RAIV sets can coexist in shelf 602.

Hardware Implementation Details

The minimum hardware requirement of the disclosed system is a function of the cost and the availability of processor, memory and system interconnect resources. As mentioned earlier, the various interconnects used in the disclosed system may be implemented using Fibre Channel. The interconnect controllers may be Fibre Channel controllers based on the Fibre Channel protocol. Other interconnects and corresponding controllers incorporating a RAID scheme can also be used without deviating from the scope of the disclosed invention. The data storage units may be implemented using S-ATA drives. The memory used for caching data may be SDRAM chips. Bus controllers may be implemented using a PCI-X bus interface. Therefore, the minimum requirement of the disclosed invention is a microprocessor with a system having a bus capable of at least 2 external interfaces to work upon the given data storage devices. It will be apparent to anyone skilled in the art that the disclosed invention may be implemented using other components. The various components mentioned above are for illustrative purposes only and in no way limit the scope of the invention.

Advantages

The data storage system controller disclosed in this invention adapts the data organization in the data storage system in accordance with the changing workload profiles. Therefore, the data storage system performance is not hampered even if the workload profile changes abruptly. The data organization is also adapted according to the power constraints, thereby, minimizing the power consumption of the data storage system. In the disclosed invention, drives that are powered simultaneously are not kept adjacent. Hence, vibration, electrical noise and heating problems, which arise during powering up of drives, are reduced substantially. Also, the disclosed invention provides a multiple data organization schemes for meeting different Quality of Service (QoS) needs of the storage applications at a given cost. Thus, the application I/O needs can be met under cost constraints without any additional processing and interconnect resources.

Another advantage of the disclosed invention is that the bandwidth from which the user would allocate via each LUN is programmable. Therefore, maximum possible bandwidth is available at all times of the operation of the data storage system. In case a storage application is not employing the data storage system, the unused bandwidth can be migrated to other LUNs. Moreover, under total I/O bandwidth constraints, the disclosed invention allows the user to meet different storage application needs on a priority basis under cost and resource constraints.

Additionally, the system components of the disclosed invention may be chosen in order to optimize cost of the data storage system with the user's bandwidth and capacity requirements. Furthermore, the disclosed invention enables the upgrading of the system components on a periodic basis, starting at the lowest possible cost.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for allocating storage resources in a system including a data storage system controller coupled to a data storage system, the method comprising:
   determining workload parameters, wherein the workload parameters include a determined access pattern of the workload;
   determining data storage system parameters, wherein the data storage system parameters include an expected I/O load per data storage unit;
   using the parameters to determine if a condition is met; and
   determining a configuration of the data storage system by writing the data in a power managed organizational scheme if the condition is met and by writing the data in a non-power managed organizational scheme if the condition is not met.

2. The method as recited in claim 1, wherein determining the workload parameters comprises:
   determining a volume size of the workload; and
   determining an I/O block size.

3. The method as recited in claim 1, wherein determining the workload parameters further comprises determining a target I/O rate for the workload.

4. The method as recited in claim 1, wherein determining the workload parameters further comprises determining an expected access pattern of the workload.

5. The method as recited in claim 1, wherein determining the data storage system parameters comprises:
   determining an expected storage utilization per data storage unit for each data storage unit in the data storage system; and
   determining an expected I/O bandwidth per data storage unit.

6. The method as recited in claim 1, wherein determining the data storage system parameters further comprises determining the number of drives currently powered on per data storage unit.

7. The method as recited in claim 1, wherein determining the data storage system parameters further comprises determining the maximum number of drives that can be powered on per data storage unit.

8. The method as recited in claim 1, wherein determining the configuration of the data storage system:
   determining target data storage unit;
   determining a data organization scheme for I/O performance of volumes based on the specified parameters; and
   determining a set of drives, in the target data storage unit, on which the volume is to be written.

9. The method as recited in claim 8, wherein determining the target data storage unit is based on the lowest disk utilization.

10. The method as recited in claim 8, wherein determining the data organization scheme comprises selecting a Redundant Array of Inexpensive Disks (RAID) organization.

11. The method as recited in claim 8, wherein determining the data organization scheme comprises selecting a power managed Redundant Array of Inexpensive Disks (RAID) organization.

12. The method as recited in claim 8, wherein determining the data organization scheme is based on power allocated to simultaneously power a maximum number of drives in the data storage unit.

13. The method as recited in claim 8, wherein a determination of a set of drives is based on environmental considerations relating to electrical noise and heating.

14. The method as recited in claim 1, further comprising allocating volumes to a location within the data storage system for continuous load balancing of the storage I/O performance of all allocated storage volumes.

15. The method of claim 1, further comprising accepting a signal from a user input device to define at least in part an organizational scheme.

16. The method of claim 15, wherein the accepting a signal is performed at a time of configuration of the system.

17. The method of claim 15, wherein the accepting a signal is performed at a time of installation of the system.

18. A method for configuring I/O performance and power consumption of a data storage system on receipt of a request for writing data, the I/O performance being measured in terms of the I/O rate, the data storage system comprising a plurality of data storage units and a data storage unit controller, each of the plurality of data storage units comprising multiple disk drives, the data being written on to the disk drives, the method comprising:

determining workload parameters, wherein the workload parameters include a determined access pattern of the workload;

determining data storage system parameters, wherein the data storage system parameters include an expected I/O load per data storage unit;

identifying target data storage units for writing the data; and if a volume of data to be written is greater than a threshold volume then writing data using a non-power managed configuration else writing data using power managed configuration.

19. The method as recited in claim 18, wherein identifying the target data storage units comprises:

estimating possible candidate data storage units having sufficient storage capacity to allocate for writing the data; and designating one of the possible candidate data storage units as a target data storage.

20. The method as recited in claim 18, wherein the step of writing data using a non-power managed configuration comprises determining the number of drives for writing the data from workload parameters.

* * * * *

UNITED STATES PATENT AND TRADEMARK OFFICE
CERTIFICATE OF CORRECTION

PATENT NO. : 7,222,216 B2
APPLICATION NO. : 11/592281
DATED : May 22, 2007
INVENTOR(S) : Guha et al.

Page 1 of 1

It is certified that error appears in the above-identified patent and that said Letters Patent is hereby corrected as shown below:

Title Page item (74) Attorney, Agent, or Firm- delete "International" and add --Intellectual--

Signed and Sealed this

Eleventh Day of December, 2007

JON W. DUDAS
*Director of the United States Patent and Trademark Office*